United States Patent [19]

vonBieren

[11] Patent Number: 5,394,377
[45] Date of Patent: Feb. 28, 1995

[54] POLARIZATION INSENSITIVE HYDROPHONE

[75] Inventor: Karlheinz vonBieren, Camarillo, Calif.

[73] Assignee: Litton Systems, Inc., Beverly Hills, Calif.

[21] Appl. No.: 69,726

[22] Filed: Jun. 1, 1993

[51] Int. Cl.⁶ ............................................. G01B 9/02
[52] U.S. Cl. .................................. 367/149; 356/345; 73/655; 250/227.14; 250/227.19; 250/227.27
[58] Field of Search ............... 367/149, 141, 153; 356/345; 73/655; 250/227.14, 227.19, 227.27

[56] References Cited

U.S. PATENT DOCUMENTS 5,253,222 10/1993 Danver et al. ................. 367/149
5,285,424 2/1994 Meyer ........................... 367/149

Primary Examiner—J. Woodrow Eldred
Attorney, Agent, or Firm—Lynn & Lynn

[57] ABSTRACT

A hydrophone is formed of first and second optical fibers coupled together to form a fiber optic interferometric sensor for sensing an acoustic signal. The optical fibers are wrapped around a pair of concentric, thin-walled hollow cylinders. The fiber wrapped around the inner cylinder is the reference leg of the interferometer and the fiber wrapped around the outer cylinder is the signal leg. The reference leg is exposed to the hydrostatic pressure but isolated from the acoustic signal. The sensing leg is exposed to both the hydrostatic pressure and the acoustic wave signal. The signal output from the interferometer is indicative of changes in the acoustic wave signal.

5 Claims, 3 Drawing Sheets

POLARIZATION INSENSITIVE HYDROPHONE

BACKGROUND OF THE INVENTION

This invention relates generally to fiber optic acoustic sensors and particularly to fiber optic acoustic sensors for underwater use. Still more particularly, this invention relates to apparatus and methods for providing a polarization-insensitive fiber optic interferometric sensor suitable for use as a hydrophone.

A single mode optical fiber is capable of guiding signals of two linear polarizations. In a fiber optic hydrophone comprised of fiber optic interferometric sensors, the output signal may be a function of the polarization of the optical signals guided by the optical fibers in the sensors. Generally the maximum signal is obtained if the two fibers guide signals of the same polarization.

A major problem of fiber optic interferometric sensors is loss of signal due to signal fading caused by changes in the polarization of the waves guided by the fibers. Drift in the relative optical path length difference in the interferometer arms causes the path length to go into and out of quadrature, which changes the signal intensity. Complete polarization fading occurs when the polarizations are orthogonal. In prior art systems, polarization signal fading may degrade the signal intensity to the point that no usable information is available.

Strumming noise occurs when the polarization input to the hydrophone interferometer is modulated. Such modulation may be caused by vibration of the input lead or by the cable used to tow a hydrophone array through water. Strumming noise changes the stress distribution in the optical fibers that comprise the interferometer, and the changes in stress distribution change the polarization of waves guided by the fibers.

Polarization fading and strumming noise have been observed regularly in sea trials of fiber optic towed hydrophone arrays. Polarization fading in such hydrophone arrays occurs when the two fibers that comprise the hydrophone have orthogonal polarization components. Polarization fading may reduce the fringe visibility in the output of interferometric sensors to zero. All hydrophone signal information then disappears.

A fiber optic polarization controller has been used to overcome the problem of polarization signal fading. This polarization controller has a plurality of loops of the optical fiber wound on spools whose edges are mounted on a common axis. The axis lies in the plane of each coil. Adjusting the angles of the loops of optical fiber adjusts the polarization state of the optical signal guided by the fiber.

Birefringence can be induced in a single mode optical fiber by bending the fiber into a coil. Bending an optical fiber causes an increase in the material density in the plane perpendicular to the plane of the coil, which increases the refractive index in that plane. Changes in the refractive index in the plane of the coil are negligible due to the opposite effect of compression on the interior and tension on the exterior part of the curvature.

The prior art has the disadvantage of requiring a manual adjustment every few minutes. This is not practical for a multisensor array that may contain seven or more sensors because such an array would be cumbersome and bulky. A fiber optic polarization controller has been used to overcome the problem of polarization signal fading. This polarization controller has a plurality of loops of the optical fiber wound on spools whose edges are mounted on a common axis. The axis lies in the plane of each coil. Adjusting the angles of the loops of optical fiber adjusts the polarization state of the optical signal guided by the fiber.

SUMMARY OF THE INVENTION

The present invention provides a fiber optic hydrophone that is insensitive to the polarization of the input optical signal.

A polarization-insensitive hydrophone that comprises first and second optical fibers coupled together to form a fiber optic interferometric sensor for sensing an acoustic signal comprises a pair of concentric, thin-walled hollow cylinders. A portion of the first optical fiber is wrapped around the inner thin-walled hollow to form a reference leg of the fiber optic interferometric sensor, and a portion of the second optical fiber is wrapped around the second thin-walled hollow to form a sensing leg of the fiber optic interferometric sensor. The sensing leg is configured for exposure to acoustic wave signals and to static acoustic pressure. The sensor further includes means for transmitting static acoustic pressure to the reference leg while absorbing acoustic wave signals to isolate the reference leg from acoustic wave signals incident upon the signal leg of the fiber optic interferometric sensor.

The polarization-insensitive hydrophone preferably includes a material that transmits static acoustic pressure and absorbs acoustic wave signals placed inside the inner thin-walled hollow cylinder and inside the outer thin-walled hollow cylinder between its inner wall and the outer wall of the inner thin-walled hollow cylinder. The reference leg of the fiber optic interferometric sensor is exposed to the same static acoustic pressure as the sensing leg and isolated from the acoustic signals that impinge on the sensing leg. The material that transmits static acoustic pressure and absorbs acoustic wave signals may comprise metal pellets or the like distributed through a rubber-like substance.

The polarization-insensitive hydrophone according to the present invention may comprise a pair of flexible membranes arranged to seal the ends of the first and second thin-walled hollow cylinders. The inner thin-walled hollow cylinder and the space inside the outer thin-walled hollow cylinder between its inner wall and the outer wall of the inner thin-walled hollow cylinder are preferably filled with a gas that transmits static acoustic pressure and attenuates acoustic wave signals.

A polarization-insensitive hydrophone according to the present invention may comprise a first hollow double-walled cylinder having an inner radius $r_1$ that encloses a first gas-filled cavity, and a second hollow double-walled cylinder having an inner radius $r_2$ that encloses a second gas-filled cavity. The first and second hollow double-walled cylinders are arranged to be concentric with the first hollow double-walled cylinder inside the second hollow double-walled cylinder. A portion of the first optical fiber is wrapped a number $N_1$ of turns around the first thin-walled hollow cylinder to form a reference leg of the fiber optic interferometric sensor; and a portion of the second optical fiber wrapped a number $N_2$ of turns around the second thin-walled hollow cylinder to form a signal leg of the fiber optic interferometric sensor. The dimensions of the first and second hollow double-walled cylinders and the numbers of turns $N_1$ and $N_2$ are selected such that as hydrostatic pressure changes on the signal and reference arms then the radii of the cylinders are satisfy the equation $dr_2/dr_1 = N_1/N_2$.

DESCRIPTION OF THE PREFERRED EMBODIMENT

Figure 1:
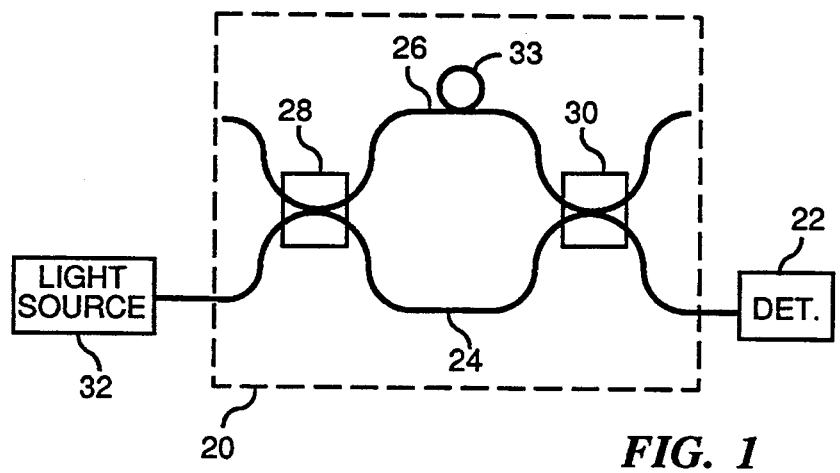
FIG. 1 illustrates a fiber optic Mach-Zehnder interferometer that may be used as an acoustic sensor in a hydrophone array.

FIG. 1 illustrates a Mach-Zehnder interferometer 20 arranged to provide an optical signal output to a photodetector 22 according to the present invention. The Mach-Zehnder interferometer 20 is illustrative of a fiber optic sensor that may be used to practice the present invention. Other devices, such as a Michelson interferometer (not shown), may be used in practicing the present invention. The following description of the present invention as used with the Mach-Zehnder interferometer 20 should be understood as illustrative of the invention rather than the scope of the invention in any way.

The Mach-Zehnder interferometer 20 includes a pair of optical fibers 24 and 26 connected between a pair of fiber optic couplers 28 and 30. The fiber optic couplers 28 and 30 may be formed from separate fibers (not shown) and then connected to the fibers 24 and 26 via splices (not shown). The optical fibers 24 and 26 are preferably ordinary single-mode, non-polarization-maintaining fibers. The fiber optic couplers 28 and 32 preferably are evanescent field couplers.

A light source 32 produces optical signals that are input to the optical fiber 24, which guides these optical signals to the fiber optic coupler 28. The fiber optic coupler 28 couples a fraction of intensity of the optical signals from the light source out of the optical fiber 24 into the optical fiber 26. In a typical application of the Mach-Zehnder interferometer 20 half of the optical signal intensity input to the fiber optic coupler 28 is coupled out of the optical fiber 24 into the optical fiber 26. Both of the optical fibers 24 and 26 then guide optical signals of equal intensity from the fiber optic coupler 28 to the fiber optic coupler 30. Just after exiting the fiber optic coupler 28, the signals guided by the optical fibers 24 and 26 are in phase.

The fiber optic coupler 30 couples part of the signal guided by the optical fiber 26 back into the optical fiber 24 where the signals combine. The optical fiber 26, for example, may include a coiled portion 33 so that the length of the optical fiber 26 between the couplers 28 and 30 is longer than the corresponding portion of the optical fiber 24. The two signals guided by the optical fibers 24 and 26 follow different optical paths so that, in general, there is a phase difference between the signals when they combine in the fiber optic coupler 30. The combined signals then propagate in the fiber 24 to the right of the coupler 30 to the detector 22 as viewed in FIG. 1.

If the two signals in the optical fibers 24 and 26 have polarization components in the same direction, the signals interfere to form a pattern of bright and dark lines that may be monitored by directing the combined optical signals to the photodetector 22. In prior art systems the interference pattern is sharpest when the optical signals in both optical fibers 24 and 26 have exactly the same polarization in the region between the couplers 28 and 30. However, when the polarizations are orthogonal, no interference pattern is produced at the detector. It is difficult to keep the polarizations the same so that clearly defined signals are obtained.

Referring still to FIG. 1, exposing the portion of the optical fiber 26 between the fiber optic couplers 28 and 30 to a physical parameter, such as acoustic pressure, changes the interference pattern that is incident upon the photodetector 22. Therefore, the value of the parameter may be continuously monitored by processing the output of the photodetector 22.

The interferometer output is described by the coherent addition of two beams of polarized light. The beams in general may have different states of polarization. For equal intensities in each leg of the Mach-Zehnder interferometer 20 the resultant intensity $I_o$ from combining the beams is $$I_o = 2I_1(1 + \cos c \cos \delta) \tag{1}$$

where $\delta$ is the phase function that is induced into the unbalanced Mach-Zehnder interferometer 20 by modulating the wavelength of the light source, typically a laser diode, that supplies light to the Mach-Zehnder interferometer 20. Typically the phase function $\delta$ is of the form $$\delta = \pi \cos(2\pi f_m t) \tag{2}$$

with the frequency $f_m$ ranging from 50 kHz to 100 kHz when the Mach-Zehnder interferometer 20 is used as a hydrophone.

Figure 2:
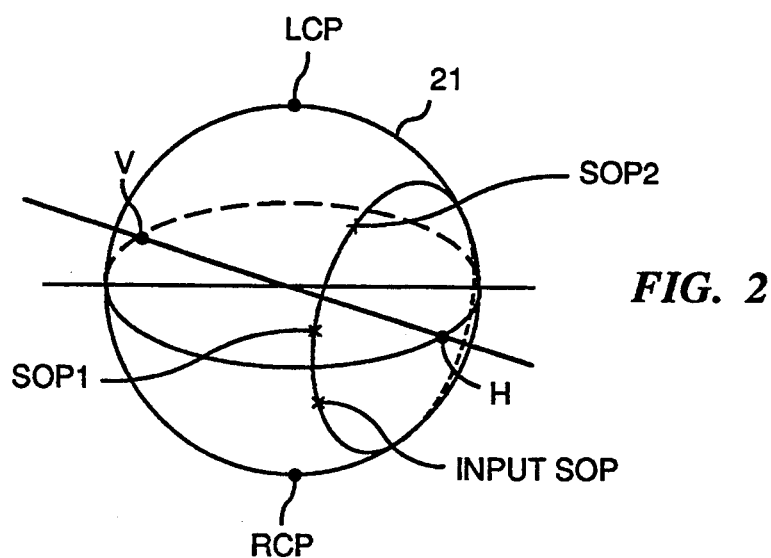
FIG. 2 illustrates a Poincare sphere representation of a fiber optic interferometer having linear birefringence.

In Eq. (1) the term (cos c) defines the effect of the two different states of polarization upon the resulting output signal. Referring to FIG. 2, The quantity c represents half the great circle length of the arc between the states of polarization on the Poincare sphere. In physical terms the angle c characterizes the phase advance that is built into the interferometer by the birefringent properties of the optical fibers 24 and 26 that comprise the two legs of the Mach-Zehnder interferometer 20.

In the simplest case it may be assumed that the two optical fibers 24 and 26 are linearly birefringent. Actually the invention may be practiced with interferometers that comprise birefringent optical fiber, even though single mode optical fiber is used to form the Mach-Zehnder interferometer 20.

In a birefringent optical fiber, light polarized on one axis (the fast axis) has a higher velocity of propagation that light polarized on the other axis (the slow axis). The fast axis is located within the plane of the loops while the slow axis is perpendicular to the plane of the loops. As a consequence of the orientation of the fast and slow axis relative to the planes of the loops and the concentric arrangement of the loops of the signal and reference legs of the Mach-Zehnder interferometer 20, the two legs have the same eigenvector H-V. This eigenvector is illustrated in FIG. 2 and is located in the equatorial plane of the Poincare sphere.

Furthermore, since the two legs of the Mach-Zehnder interferometer 20 receive the same input signal, which may be of any polarization state, the states of polarization of the two output signals, labeled SOP1 and SOP2 in FIG. 2, of the optical fibers 24 and 26, respectively must be located on the same small circle. This circle is formed by rotating the Poincare sphere 21 about the eigenvector H-V. The angle of rotation required to proceed from SOP1 to SOP2 is equal to the birefringent phase advance that results from a path length difference in the two interferometer legs.

For the general case where the eigenmodes of the two interferometer legs are different, it is still possible to describe the polarization behavior of the interferometer by a single operator together with a rotational magnitude (phase delay) on the Poincare sphere.

Figure 3:
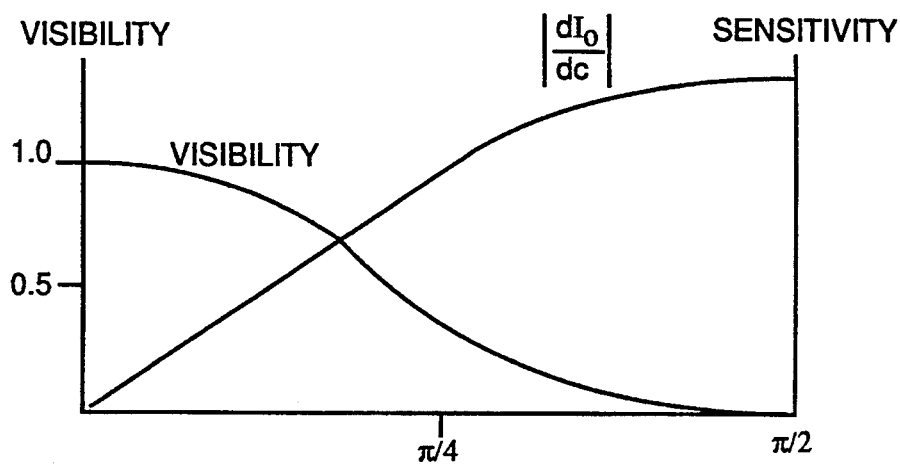
FIG. 3 graphically illustrates the dependence of fringe visibility and strumming noise upon the arc length in a fiber optic hydrophone.

Eq. (1) indicates the fringe visibility V to be described by the function $$V = \cos c \quad (3)$$

which is shown in FIG. 3. Therefore, the effect of polarization fading is directly dependent upon (cos c). Determining the sensitivity of the interferometer with respect to input polarization modulation (strumming noise), involves differentiation of Eq. (1), which results in $$dI_o/dc = -2I_1 \sin c \cos \delta \quad (4)$$

which is also shown in FIG. 3. There are values of c where the fringe visibility is one and the strumming noise parameter $dI_o/dc = 0$. Due to the periodicity of the cosine function, a large number of values for c exist that satisfy the requirement for elimination of polarization fading and strumming noise. The basic requirement is that $$c = n\pi \quad (5)$$

where $n = 0, 1, 2 \ldots$. The parameter c in Eq. (1) is a function of the input state of polarization and of the state of polarization of signals output from the optical fibers 24 and 26 that comprise the two legs of the Mach-Zehnder interferometer 20. However, for certain values of the output polarization states, polarization fading and strumming noise are eliminated for any polarization of signals input to the Mach-Zehnder interferometer 20.

Figure 4:
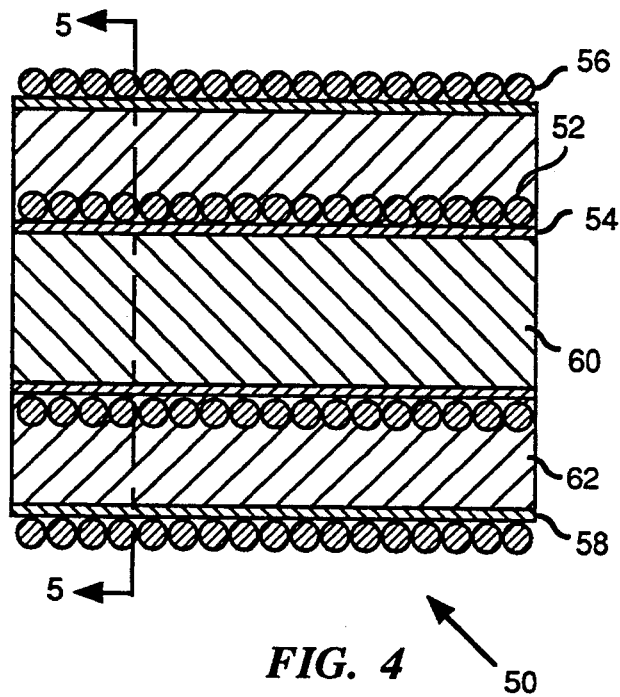
FIG. 4 is a cross sectional view of a hydrostatically balanced fiber optic hydrophone formed according to the present invention.
Figure 5:
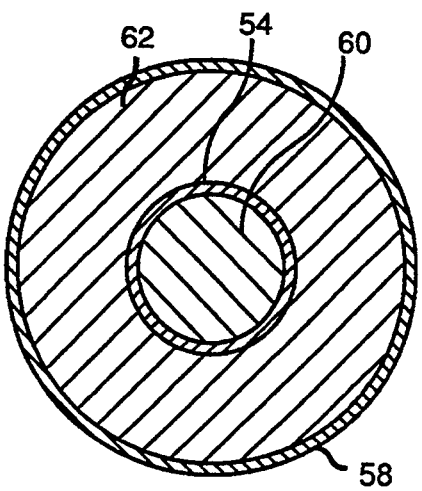
FIG. 5 is a cross sectional view taken long line 5—5 of FIG. 4.

FIG. 4 illustrates a hydrophone 50 formed according to the principles described above to eliminate polarization fading and strumming noise. The reference leg of the hydrophone 50 is formed by winding coils of an optical fiber 52 on an inner thin-walled cylinder 54. Similarly, the signal leg is formed by winding coils of an optical fiber 56 on an outer thin-walled cylinder 58. The cylinders 54 and 58 are arranged so that the cylinder 54 fits concentrically inside the cylinder 58. The optical fibers 52 and 56 are incorporated into a Mach-Zehnder interferometer (not shown) of the type shown in FIG. 1.

The center of the cylinder 54 is filled with a jelly-like material 60. The space enclosed between the outer walls of the inner cylinder 54 and the inner wall of the cylinder 58 is also filled with a jelly-like material 62, which is preferably identical to the jelly-like material 60.

The conditions of Eq. (5) may be satisfied by an interferometer having equal path lengths for the two legs. The equal path length interferometer is a special case of the conditions of Eq. (5) in which $n = 0$. For unequal path lengths $n > 0$. However once the number n has been selected, the same number must be maintained for all environmental conditions, including variable hydrostatic pressure. Hence, the same birefringent phase delay must be preserved under varying hydrostatic conditions.

The two legs of fiber optic hydrophones generally are made up of a number of optical fiber loops formed on a thin-walled cylinder. A polarization-immune fiber optic hydrophone may be designed to be hydrostatically balanced where the hydrostatic pressure is allowed to act on both the outside and inside walls of the signal cylinder and the reference cylinder. In the hydrophone 50 the jelly-like filling materials 60 and 62 transmit the hydrostatic pressure, but absorbs the acoustic wave signal from a sound propagating in the water medium in which the hydrophone is submerged. The result is that the hydrostatic pressure and the acoustic wave signal are applied to the optical fiber 52 whereas only the hydrostatic pressure is applied to the optical fiber 56. Therefore, the interference pattern formed when the signals in the sensing and reference optical fibers are combined is indicative of the acoustic wave applied to the signal leg.

Figure 9:
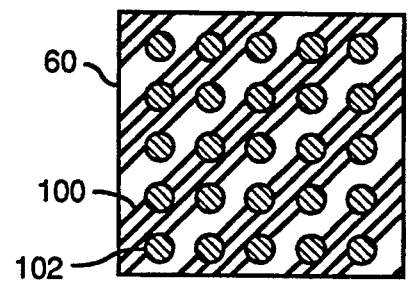
FIG. 9 illustrates a plurality of metal pellets imbedded in a rubber-like material.

The hydrostatically balanced hydrophone of FIG. 4 includes a jelly-like material 62 that transmits the hydrostatic pressure while attenuating all acoustic signals above a designated cut-off frequency. Referring to FIG. 9 The jelly-like materials 60 and 62 may be formed by loading a rubber-like material 100 such as RTV with small pellets 102 made of a metal, such as steel or lead. The metal pellets 102 preferably are essentially uniformly distributed throughout the rubber-like material.

Figure 10:
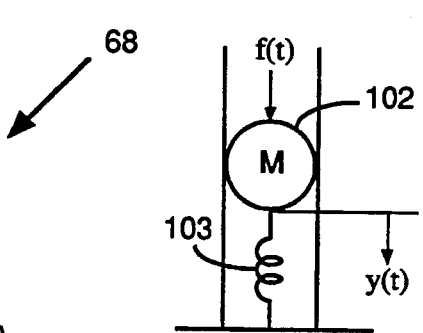
FIG. 10 illustrates a model of an oscillatory system that includes a metal pellet imbedded in a rubber-like material.

To analyze the system each individual pellet 102 may be regarded as being suspended by a spring that represents the rubber-like material. FIG. 10 represents each individual metal pellet and its immediate surroundings. Referring to FIG. 10, a pellet 102 having a mass M is connected to an end of a spring 103 having a spring constant k. The rubber-like material exerts a frictional drag B on the pellet. A time dependent force f(t) is applied to the pellet 102 in line with the spring. The resulting displacement of the pellet is designated as x(t). Force equilibrium considerations lead to the following differential equation:

$$y(t) = M\frac{d^2y}{dt^2} + B\frac{dy}{dt} + ky \quad (6)$$

$$y(t) = \frac{F_m \cos(\omega t - \theta)}{M[(\beta_0^2 - \omega^2)^2 + 4\alpha^2\omega^2]^{\frac{1}{2}}} \quad (8)$$

where $$\beta_0 = \sqrt{\frac{k}{M}} \text{ and}$$

$$\alpha = \frac{B}{2M}.$$

Figure 11:
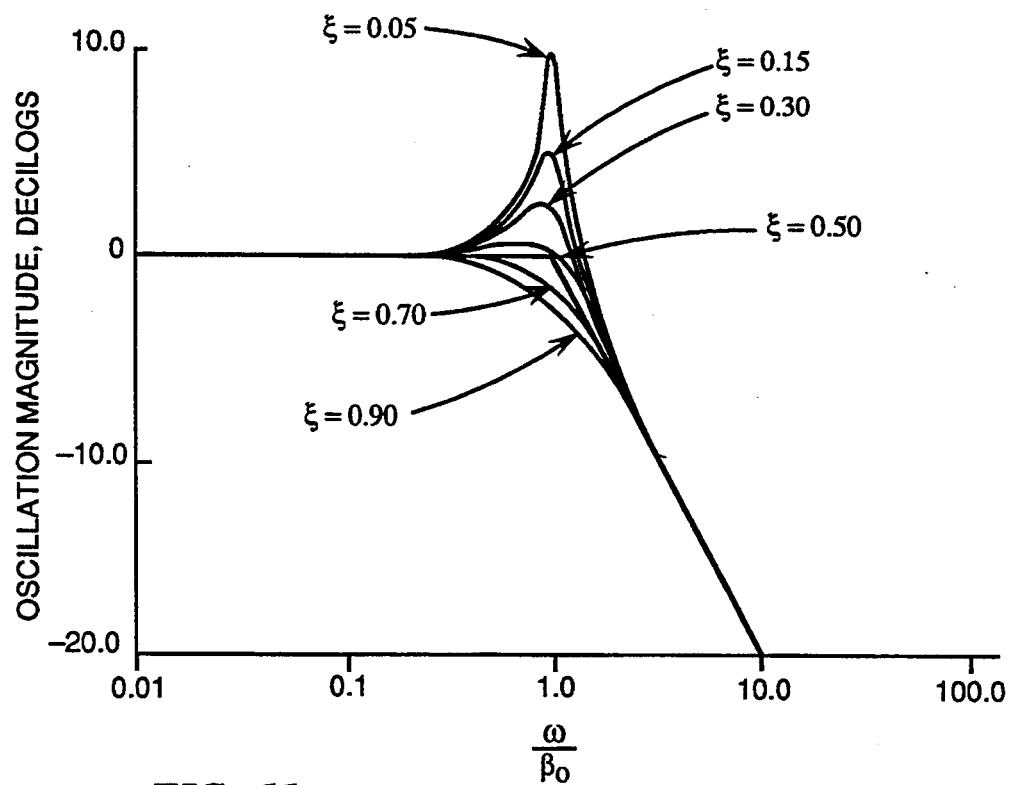
FIG. 11 graphically illustrates the amplitude of oscillations of the system shown in FIG. 10 as a function of frequency.

FIG. 11 shows the magnitude curves for solutions of Eq. (6) for six different values of the friction dependent parameter $$\xi = \frac{k}{2\sqrt{MC}}.$$

The important break point in the curves of FIG. 11 occurs at $\omega = \beta_o$. As shown in Eq. (4), the break point frequency can only be modified through the mass parameter M or through the spring constant k.

Hence, by imbedding the proper amount of metal pellets within the rubber-like substance, the break point frequency $\omega = \beta_o$ can be shifted to very low values. The material thus is a low pass filter for mechanical vibrations. For example, $\beta_o$ can be selected to correspond to 5 Hz. As shown in FIG. 11, all signals below 5 Hz penetrate this low-pass filter without attenuation. In particular the hydrostatic pressure having a frequency of zero passes through without attenuation. Frequencies above the break point frequency are attenuated according to the slope value of 20 dB per octave.

Figure 6:
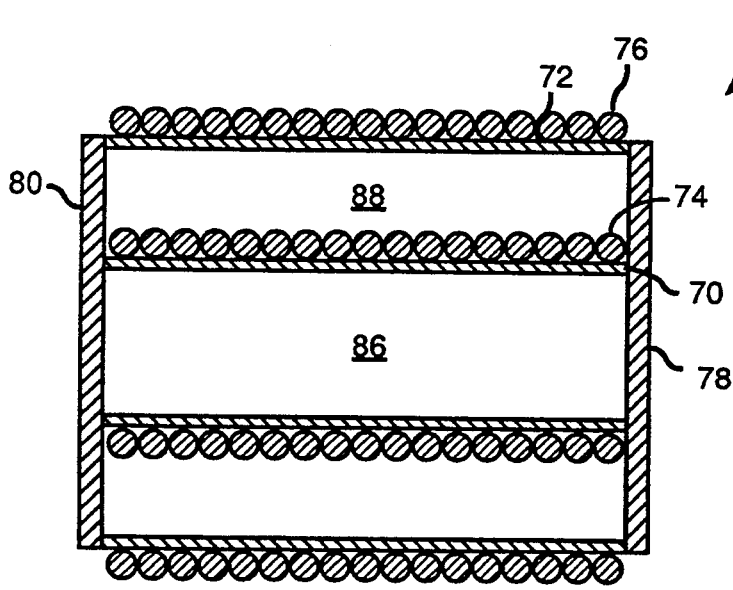
FIG. 6 is a cross sectional view of a pressure balanced fiber optic hydrophone formed according to the present invention.

Referring to FIG. 6, a sensor 68 having improved sensitivity may be formed by providing air cushions within the sensor. FIG. 6 shows a pair of concentric thin-walled cylinders 70 and 72. A coil of optical fiber 74 is formed on the inner cylinder 70, and a coil of optical fiber 76 is formed on the outer cylinder 72. The optical fibers 74 and 76 are incorporated into a Mach-Zehnder interferometer (not shown) of the type shown in FIG. 1.

Flexible membranes 78 and 80 may be mounted at the ends of the cylinders 70 and 72 to provide for transmission of the hydrostatic pressure into the inside of the hydrophone. The space enclosed by the inner cylinder 70 between the flexible membranes 78 and 80 is filled with air or other similar gas. Similarly, the space enclosed between the outer wall of the inner cylinder 70 and the inner wall of the outer cylinder 72 is filled with air. The flexible membranes 78 and 80 allow the transmission of the hydrostatic pressure from the water in which the sensor 68 is submerged into the air compartments 86 and 88 inside of the cylinders 70 and 72. Shielding the reference leg (the inner fiber 74) from the acoustic signal is provided by the acoustic absorption properties of the flexible membranes and 80 and by the mismatch of the acoustic impedance at the water-membrane-air interfaces.

Figure 7:
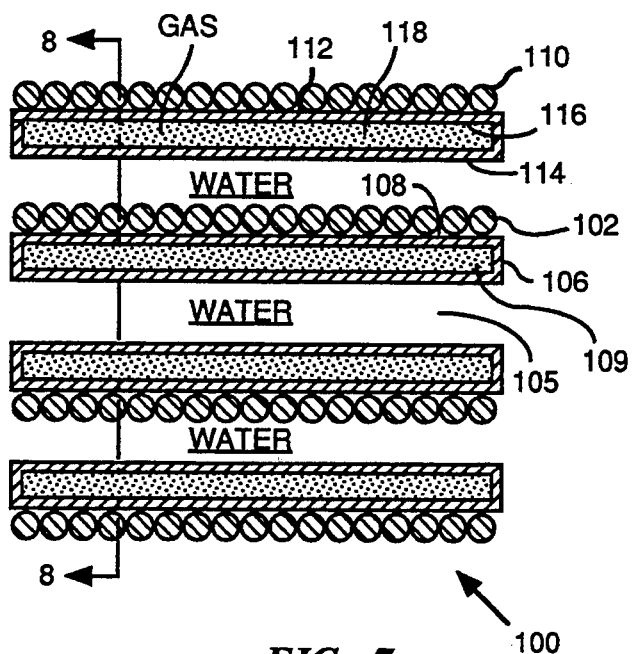
FIG. 7 is a cross sectional view of a pressure-unbalanced fiber optic hydrophone formed according to the present invention.
Figure 8:
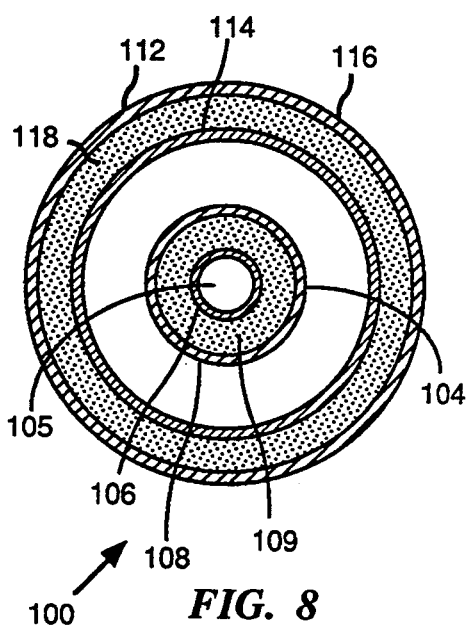
FIG. 8 is a cross sectional view taken long line 8—8 of FIG. 7.

If a hydrostatic unbalance between the inside and outside walls of the two cylinders is allowed to exist, then special provisions must be made to insure satisfaction of Eq. (5) for variable hydrostatic conditions. FIGS. 7 and 8 illustrate a fiber optic hydrophone 100 that maintains the conditions necessary to insure satisfaction of Eq. (5).

Referring to FIGS. 7 and 8, an optical fiber 102 is wrapped around a hollow double-walled cylinder 104 that has inner and outer walls 106 and 108, respectively. The space 109 between the inner and outer walls 106 and 108 is filled with air or other similar gas. The cylinder 104 encloses a central cavity 105 that is exposed to the water.

An optical fiber 110 is wrapped around a hollow double-walled cylinder 112. The cylinder 112 has inner and outer walls 114 and 116, respectively. The optical fibers 102 and 110 are incorporated into a Mach-Zehnder interferometer (not shown) as illustrated in FIG. 1.

The space 118 between the inner and outer walls 114 and 116 is filled with air or other similar gas. The cylinders 104 and 112 are arranged so that they are concentric. The cylinder 104 is inside the cylinder 112. The space between the optical fiber 102 and the inner wall 114 of the outer cylinder 112 is also exposed to the water.

The optical fiber 102 is the reference leg of the interferometer, and the optical fiber 110 is the sensing leg. For the same hydrostatic unbalanced conditions at the signal leg with radius $r_2$ and the reference leg having radius $r_1$, the larger diameter cylinder 112 normally experiences a larger deflection $dr_2$ than the smaller diameter cylinder upon a change in hydrostatic pressure. If it is assumed that only the length of the optical fiber changes upon a change in hydrostatic pressure with the birefringence remaining constant then the following conditions must be satisfied in order to fulfill the condition of Eq. (5):

$$dr_2/dr_1 = N_1/n_2 \qquad (9)$$

where $N_1$ and $N_2$ are the number of loops of optical fiber in the reference leg and the signal leg, respectively. The requirement expressed in Eq. (6) can be met in a variety of ways. One means for satisfying Eq. (6) is selection of different wall thicknesses for the cylinders 70 and 72. Another means for satisfying Eq. (6) is replacing air in the inner cylinder with a material having a different modulus of elasticity.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A polarization-insensitive hydrophone that comprises first and second optical fibers coupled together to form a fiber optic interferometric sensor for sensing an acoustic signal comprising:
   a first thin-walled hollow cylinder;
   a portion of the first optical fiber wrapped around the first thin-walled hollow to form a reference leg of the fiber optic interferometric sensor;
   a second thin-walled hollow cylinder, the first and second thin-walled hollow cylinders being arranged to be concentric with the first thin-walled hollow cylinder inside the second thin-walled hollow cylinder;
   a portion of the second optical fiber wrapped around the second thin-walled hollow to form a sensing leg of the fiber optic interferometric sensor, the sensing leg being configured for exposure to acoustic wave signals and to static acoustic pressure; and means for transmitting static acoustic pressure to the reference leg while absorbing acoustic wave signals to isolate the reference leg from acoustic wave signals incident upon the signal leg of the fiber optic interferometric sensor.

2. The polarization-insensitive hydrophone of claim 1 wherein the means for transmitting static acoustic pressure to the reference leg while absorbing acoustic wave signals comprises a material that transmits static acoustic pressure and absorbs acoustic wave signals placed inside the first thin-walled hollow cylinder and inside the second thin-walled hollow cylinder between its inner wall and the outer wall of the first thin-walled hollow cylinder such that the reference leg of the fiber optic interferometric sensor is exposed to the same static acoustic pressure as the sensing leg and isolated from the acoustic signals that impinge on the sensing leg.

3. The polarization-insensitive hydrophone of claim 2 wherein the material that transmits static acoustic pressure and absorbs acoustic wave signals comprises metal pellets distributed through a resilient substance.

4. The polarization-insensitive hydrophone of claim 1, comprising a pair of flexible membrane arranged to seal the ends of the first and second thin-walled hollow cylinders, the first thin-walled hollow cylinder and the space inside the second thin-walled hollow cylinder between its inner wall and the outer wall of the first thin-walled hollow cylinder being filled with a gas that transmits static acoustic pressure and attenuates acoustic wave signals.

5. A polarization-insensitive hydrophone that comprises first and second optical fibers coupled together to form a fiber optic interferometric sensor for sensing an acoustic signal comprising:

a first hollow double-walled cylinder having an inner radius $r_1$ that encloses a first gas-filled cavity;

a portion of the first optical fiber wrapped a number $N_1$ of turns around the first thin-walled hollow cylinder to form a reference leg of the fiber optic interferometric sensor;

a second hollow double-walled cylinder having an inner radius $r_2$ that encloses a second gas-filled cavity, the first and second hollow double-walled cylinders being arranged to be concentric with the first hollow double-walled cylinder inside the second hollow double-walled cylinder; and a portion of the second optical fiber wrapped a number $N_2$ of turns around the second thin-walled hollow cylinder to form a signal leg of the fiber optic interferometric sensor; the dimensions of the first and second hollow double-walled cylinders and the numbers of turns $N_1$ and $N_2$ being selected such that as hydrostatic pressure changes on the signal and reference arms the changes in the dimensions of the cylinders satisfies the equation $dr_2/dr_1 = N_1/N_2$ ", where $dr_1$ and $dr_2$ are deflections of the first and second cylinders, respectively".

* * * * *